(12) United States Patent
Maiwald et al.

(10) Patent No.: US 6,811,765 B1
(45) Date of Patent: Nov. 2, 2004

(54) THERMAL TREATMENT OF FINE GRAIN MATERIALS IN A COARSE-GRAIN FLUIDIZED BED

(75) Inventors: Rolf Maiwald, Freiberg (DE); Hans Zeiringer, Kappel (AT)

(73) Assignee: Epion Corporation, Billerica, MA (US)

( * ) Notice: Subject to any disclaimer, the term of this patent is extended or adjusted under 35 U.S.C. 154(b) by 0 days.

(21) Appl. No.: 09/554,379

(22) PCT Filed: Oct. 31, 1998

(86) PCT No.: PCT/EP98/06903

§ 371 (c)(1),
(2), (4) Date: Aug. 15, 2000

(87) PCT Pub. No.: WO99/25884

PCT Pub. Date: May 27, 1999

(30) Foreign Application Priority Data

Nov. 14, 1997 (DE) ......................................... 197 50 475

(51) Int. Cl.$^7$ .................................................. B01J 8/00
(52) U.S. Cl. ............................... 423/659; 423/DIG. 16; 422/139
(58) Field of Search ......................... 423/625, DIG. 16, 423/111, 74, 148, 659; 422/139, 145; 51/307, 309

(56) References Cited

U.S. PATENT DOCUMENTS

| | | | |
|---|---|---|---|
| 3,565,408 A | * | 2/1971 | Reh et al. |
| 3,579,616 A | * | 5/1971 | Reh et al. |
| 4,374,663 A | * | 2/1983 | Collin et al. |
| 5,415,111 A | * | 5/1995 | Lewnard et al. |

FOREIGN PATENT DOCUMENTS

| | | | |
|---|---|---|---|
| EP | 534243 | * | 3/1993 |
| GB | 781994 | * | 8/1957 |
| GB | 2247307 | * | 2/1992 |

OTHER PUBLICATIONS

Japanese Patent Abstract, JP 04–2104111, Jul. 1992.*
Abstract of EP 126001, Nov. 1984.*
Abstract of FR 2556983, Jun. 1985.*

* cited by examiner

*Primary Examiner*—Steven Bos
(74) *Attorney, Agent, or Firm*—Perkins Smith & Cohen; Jerry Cohen; John A. Hamilton

(57) ABSTRACT

The invention relates to a method for heat-treating fine-grained materials which tend to agglomerate at high temperatures and which have an average grain size of preferably 0 to 1000 $\mu$m within temperature ranges around and above the agglomeration temperature, in a fluidized bed of another, coarse-grained material. The temperature range in which the coarse-grained material tends to agglomerate and sinter to the reactor walls is higher than that of the fine-grained material. The coarse-grained material used is a material of the same type, a similar type or a different type with an average grain size of 1 to 10 mm. The fine-grained material is fed in directly over the tuyere bottom of a closed furnace chamber containing the fluidized bed, performs a circulating movement in said fluidized bed and once the heat treatment has been carried out, is pneumatically withdrawn from the fluidized bed into the top section of the furnace, and cooled immediately.

10 Claims, 1 Drawing Sheet

THERMAL TREATMENT OF FINE GRAIN MATERIALS IN A COARSE-GRAIN FLUIDIZED BED

BACKGROUND OF THE INVENTION

The invention concerns a method of thermal treatment of fine grain materials.

In chemical and metallurgical process technology there is, from time to time, the need for subjecting fine-grained solid substances to thermal treatment. This may lead to a softening of the substance and/or of its individual phases. The formation of agglomerates and settlements on the walls of the aggregate used for the thermal treatment is undesirable and may negatively impact the product quality and/or impair the course of the process. The agglomerates must subsequently be crushed at great technological expenditures, and the product needs to be reclassified.

An obvious solution for the treatment of fine-grained solid matter is a suspension process in which the fine-grained solid matter is suspended in a gaseous medium. Such gas/solid matter systems are known, for example, as stationary and as circulation fluidized beds. (Fluidized-bed processes for the chemical and metallurgical industries, energy conversion and environmental protection, *Chem. -Ing. -Technik* 55, 1983, No. 2, pages 87–93). The former work at flow rates below the pneumatic discharge speed to be allocated to the solid matter, the latter, above it; high density of the solid matter is characteristic for both systems, in contrast with the flow reactor which works with low density of the solid matter. If the work is conducted at temperatures within or above the softening range of the solid-matter particles or of individual phases thereof, they will agglomerate even in the fluidized bed and will cake onto the reactor walls.

In DE-OS 3 540 206, a high-temperature suspension process is described for the calcination and for the burning of aluminum hydroxide at 1400 ° C. which uses a circulation fluidized bed to heat and calcinate the solid matter, and a current reactor to bum the $Al_2O_3$ at 1400° C. An agglomeration of the solid-matter particles is avoided by feeding the preheated aluminum hydroxide directly into the burner flame, thereby heating it to 1400° C. Complete calcination occurs during transport through the current reactor. In addition, in order to prevent agglomerations, the process proceeds at a low density of the solid matter in the reaction zone of the current reactor, and cooling occurs in the upper part of the current reactor by air. Sintering to the oven wall is supposed to be avoided through the high speed of the solid-matter particles relative to the oven wall.

The disadvantage of this method lies in the involved technical apparatus for the heating and the calcination of the solid matter in a circulation fluidized bed and in executing the high-temperature reaction in the downstream current reactor. In spite of low solid-matter density, deposits on the reactor walls due to whirling and reflux cannot be avoided.

SUMMARY OF THE INVENTION

Starting from the deficiencies of known solutions, the invention at hand is based on the objective of providing a method and an aggregate for the thermal treatment of fine-grained substances with a grain size of preferably 0 to 1000 μm with a tendency to agglomerate and/or to cake onto the reactor walls at higher temperatures that allows a thermal treatment within the temperature range of their softening and sintering while at the same time precluding the agglomeration of the particles to a large extent and preventing the particles from sintering on the walls of the aggregate.

According to the invention, this objective is attained by a process for thermally treating fine grain materials having an average grain size of approximately 0 to 1000 μm and a tendency towards agglomeration at temperature ranges near and above the agglomeration temperature in a coarse grain extraneous fluidized bed, wherein the temperature range in which the coarse grain shows a tendency towards agglomeration and sintering on the reactor walls due to the particle size and the composition of the material lies above that of the fine grain. The fine grain material may be composed of an abrasive material of corundum or mixtures of corundum and titanium oxide, zirconium oxide, chromium oxide or carbon, while the coarse grain material may be a material similar in nature, or related and/or unrelated and has an average grain size of 1 to 10 mm. The process is executed in an aggregate in the form of a two stage apparatus whose bottom stage is a fluidized bed segment and whose upper stage is a double-walled cooler (upper-oven segment), wherein the interior wall temperatures of the fludized bed segment (20) and the upper oven segment (30) lies at least 10 to 200° C., preferably 100° C., below the softening and/or agglomeration temperature of the fine grain. The fluidized bed is formed in the fluidized bed segment, an oven space that is closed in itself when completely filled. The fine grain is carried in immediately above the bottom of the fluidized bed, executing a circulating motion and being subjected to a chemical and physical reaction during the thermal treatment, and is carried pneumatically from the fluidized bed into the upper oven segment where it is cooled down to below its softening or agglomeration temperature.

DETAILED DESCRIPTION OF PREFERRED EMBODIMENTS OF THE INVENTION

Figure 1:
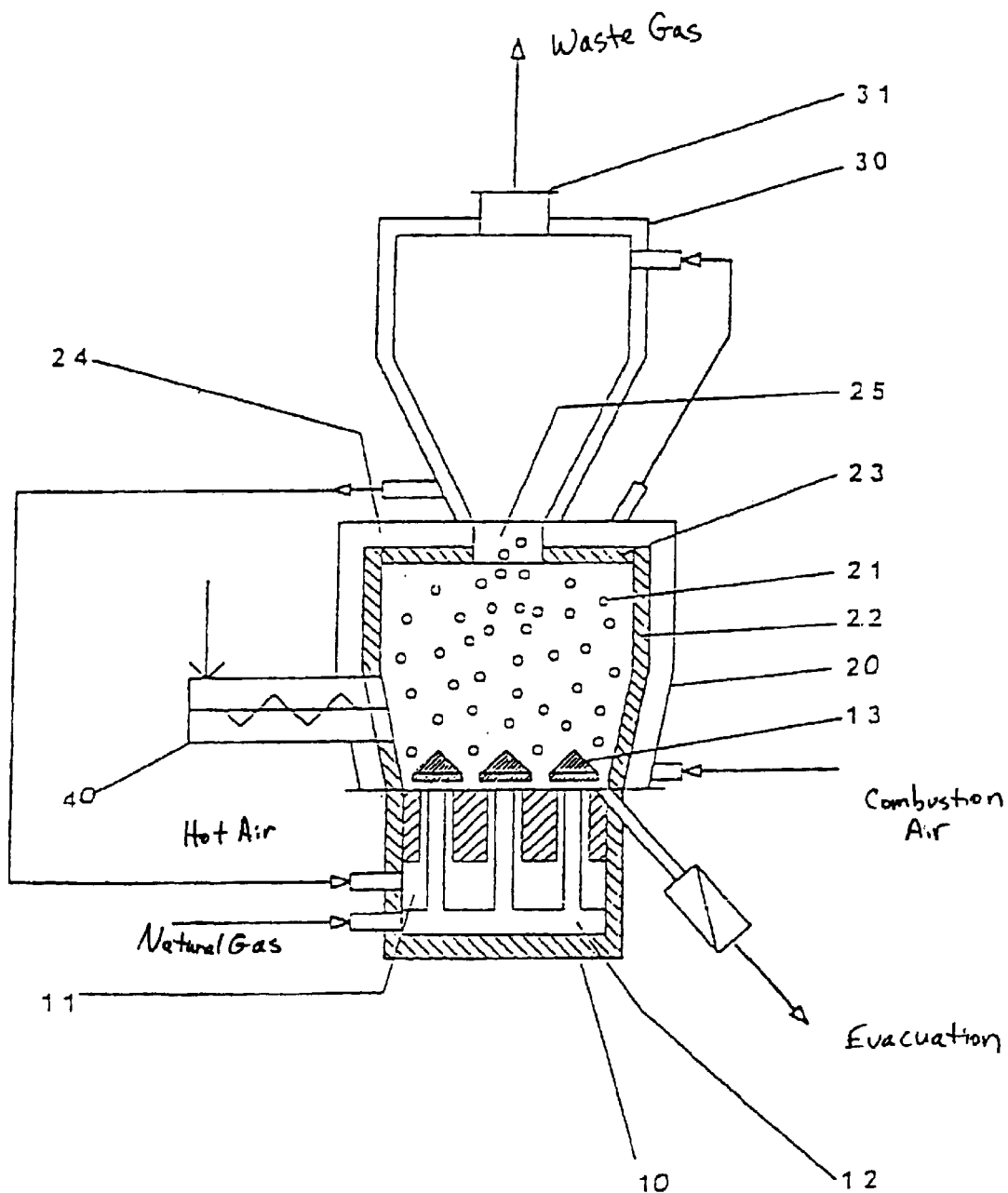
FIG. 1 is a schematic of an apparatus for practicing a process in accordance with the present invention.

Other features described below enable profitable continued developments of the invention.

The coarse grain consists of the same, similar and/or different substances of a grain size of 1 to 10 mm. The pushing and grinding effect of the coarse grain forming the extraneous fluidized bed on the one hand, and the temperature difference between the softening and sintering temperature of the course grain and the fine grain on the other hand prevent the agglomeration of the fine-grain particles among each other, the sintering onto the coarse-grain particles of the extraneous fluidized bed and the sintering onto the reactor walls. Essential for the invention is the fact that the fluidized bed is achieved in a closed conic oven space when the latter is completely filled, that the fine grain is fed into it directly above the nozzle grating, with the filling performing a circulating movement that increases the retention time. The desired chemical or physical reaction in the fine grain occurs during this process in the prevailing oven atmosphere.

Essential for the invention is the fact that the fluidized bed is achieved in a closed conic oven space when the latter is completely filled, that the fine grain is fed into it directly above the nozzle grating, with the filling performing a circulating movement that increases the retention time. The desired chemical or physical reaction in the fine grain occurs during this process in the prevailing oven atmosphere.

The aggregate consists of a two-level apparatus whose lower level constitutes a fluidized bed segment in which a fluidized bed is generated, and whose upper level—the upper oven segment—has been executed as a double-walled cooling apparatus and which, in accordance with the invention, features interior-wall temperatures that are not less than 10° C. to 200° C., preferably 100° C. below the softening or agglomeration temperature of the fine grain, thereby preventing any deposits on its walls. The fluidized bed segment is lined with ceramics, with the lateral walls and the top wall equipped with cooling jackets. The upper oven segment is executed as a double-walled cooler in which the combustion air functions as a coolant. The upper oven segment is conically shaped in its bottom part, while the top part has a cylindrical shape. This leads to the formation of circulating movements of the fine grain which intensifies its cooling.

In accordance with the invention, the fine grain is pneumatically transported out into double-walled upper oven segment that functions as a cooling device, through a centrally located opening called a diffuser neck, where it is cooled down below its agglomeration temperature. This prevents a subsequent sintering and the formation of agglomerations on the walls of the upper oven segment.

The difference in size between the coarse grain of the extraneous fluidized bed and the fine grain must be selected in such a manner that the pneumatic feeding of the coarse grain into the upper oven segment is largely prevented, and with it its undesired cooling. An essential part of the invention is the fact that the diffuser neck has an opening ratio of $$O = \frac{\text{fluidized- bed area}}{\text{diffuser neck area}} = 6 \text{ to } 9$$

and linear ratio of $$L = \frac{\text{length of the diffuser neck}}{\text{diffuser neck diameter}} = 0.5 \text{ to } 1$$

so that the feedback of coarse grain of the extraneous fluidized bed from the upper oven into the fluidized bed is made possible, while an undesirable feedback of fine grain into the fluidized bed is greatly restricted.

The invention is to be described hereafter in more detailed fashion by means of a construction model which refers to the treatment of abrasive grain on the basis of corundum alloyed with titanium oxide.

FIG. 1 shows a schematic cut through a fluidized-bed oven suitable for the execution of the process according to this invention that features a valve tray 10, a fluidized-bed segment 20, an upper-oven segment 30, and a feed device 40.

Hot air and fuel gas are fed into the valve tray 10 via an air chamber 11 and a gas chamber 12 in such a way that they exit from the nozzle heads 13 thoroughly mixed and burn up in the fluidized-bed segment 20. The smoke gas generated thereby creates a fluidized bed 21 consisting of coarse-grained melting corundum grains which at the same time are heated to temperatures of up to >1350° C. The fluidized-bed segment 20 consists of the ceramic interior wall 22 and the roof wall 23 both of which are enveloped in a cooling jacket 24. Cold combustion air is fed into the latter as cooling air. This leads to a reduction in the temperature on the ceramic interior wall 22 on the inner side to <1000° C.

Sinter-sensitive corundum fine grain is fed into the fluidized-bed layer with the aid of the feeding device 40 which is located directly above the valve tray; during this process, the fine grain corundum distributes itself between the coarse-grained melting corundum particles and is heated to, for example, 1350° C. At the same time, part of the $Ti_2O_3$ dissolved in the corundum grain oxidizes into $TiO_2$ and is eliminated. The light refraction caused thereby provides the desired blue coloration of the abrasive grain. The heated abrasive grain is then pneumatically transported upwards. The larger portion bounces against the ceramic roof wall 23 and is forced back into the fluidized bed 21. The smaller portion migrates through a diffuser neck 25 into the upper-oven segment 30, where it is cooled below its agglomeration or sintering temperature, carried through the exhaust gas pipe 31 into the exhaust gas system and finally emitted in the down-stream cyclone and cloth filter. The diffuser neck 25 features an opening ratio of $$O = \frac{\text{fluidized bed area}}{\text{diffuser neck area}} = 7$$

and a linear ratio of $$L = \frac{\text{diffuser neck length}}{\text{diffuser neck diameter}} = 0.7$$

The upper-oven segment 30 is executed as a double-walled heat exchanger. It consists of a conical bottom part with a cone angle of 35° and a cylindrical top part. The combustion air acts as a coolant which is fed into the air chamber 11 of the valve tray as hot air of 700 to 800° via the cooling jacket 24 and the upper oven segment 30.

In the process according to the invention, the fine-grain solid matter is carried into a coarse-grain extraneous fluidized bed which is generated in an oven chamber that is completely closed in itself when it is completely filled. The impact and abrasion effect of the coarse grain prevents a sintering of the fine grains with each other, onto the coarse grain and onto the reactor walls.

The aggregate for the execution of the process is a two-tier apparatus whose lower tier is executed as a fluidized-bed segment and the upper tier as a double-walled cooler; its interior-wall temperature lies at least 10° C. to 200° C., preferably 100° C., below the softening and/or agglomeration temperature of the fine grain. This prevents a sintering on the reactor walls.

The process permits, for example, a nearly agglomeration-free blue annealing of fine-grain abrasive materials on the basis of a corundum alloyed with titanium oxide at temperatures of up to 1350° C.

What is claimed is:
1. Process for the thermal treatment in a reactor of a fine-grain material with an average grain size under 1000 $\mu$m comprising the steps of:
 (a) establishing and maintaining, in a walled reactor space, a fluidized bed of suspended coarse grain material of 1 to 10 mm grain size and imparting a high temperature to the atmosphere of such space and the coarse grain material;
 (b) inserting the fine grain material to be treated immediately above the bottom of the fluidized bed and imparting a circulating motion to the fine grain material in the reactor space;
 (c) subjecting the fine grain material to thermal treatment for a chemical or physical reaction; and
 (d) transporting the fine grain material pneumatically through a diffuser neck having an opening ratio of fluidized-bed area to diffuser neck area within a range of 6 to 9 and a linear ratio of diffuser neck length to diffuser neck diameter within an 0.5 to 1 range from the fluidized bed into an upper oven segment above the reactor where the fine grain material is cooled to below its softening or agglomeration temperature.

2. Process according to claim 1 wherein the thermal treatment is carried out as an oxidation process.

3. Process according to claim 1 wherein the thermal treatment is carried out as a reduction process.

4. Process according to claim 1 wherein the thermal treatment is carried out as a physical process.

5. Process according to one of claims 1 through 4 wherein the fine grain material comprises an abrasive material which comprises corundum.

6. Process according to claim 5 wherein the fine grain material comprises corundum mixed with a material selected from the group consisting of titanium oxide, zirconium oxide, chromium oxide and carbon.

7. The process of claim 1 wherein the coarse-grain material and fine-grain material are of different compositions.

8. The process of claim 1 wherein the coarse-grain material and fine-grain material are of substantially the same composition.

9. Process according to claim 1, wherein the process is controlled to limit upper oven segment wall temperatures at 10–200° C. below softening or agglomeration temperature of the fine grain material.

10. Process according to claim 1, the process as a whole precluding the agglomeration of the fine grain material and preventing the fine grain material from sintering on the walls of the aggregate.

* * * * *

UNITED STATES PATENT AND TRADEMARK OFFICE
CERTIFICATE OF CORRECTION

PATENT NO. : 6,811,765 B1
DATED : November 2, 2004
INVENTOR(S) : Rolf Maiwald and Hans Zeiringer It is certified that error appears in the above-identified patent and that said Letters Patent is hereby corrected as shown below:

<u>Title page,</u>
Item [73], Assignee, change from "Epion Corporation, Billerica, MA (US)" to
-- Treibacher Schleifmittel AG, Villach, Austria --

Signed and Sealed this

Seventh Day of June, 2005

JON W. DUDAS
*Director of the United States Patent and Trademark Office*